United States Patent [19]

Berenschot et al.

[11] 4,132,688

[45] Jan. 2, 1979

[54] AQUEOUS DISPERSION THERMOSETTING COATING COMPOSITIONS BASED ON AQUEOUS EMULSION COPOLYMERS CONTAINING TWO SOURCES OF HYDROXY FUNCTIONALITY

[75] Inventors: Donald J. Berenschot, Chicago; Dale F. Anders, Des Plaines; Fred D. Hawker, Villa Park, all of Ill.

[73] Assignee: DeSota, Inc., Des Plaines, Ill.

[21] Appl. No.: 785,664

[22] Filed: Apr. 7, 1977

Related U.S. Application Data

[63] Continuation-in-part of Ser. No. 192,565, Oct. 26, 1971, abandoned, and Ser. No. 351,453, Apr. 16, 1973, abandoned.

[51] Int. Cl.$^2$ .................. C09D 3/52; C09D 3/66; C08L 61/28
[52] U.S. Cl. .................. 260/22 CB; 260/21; 260/23 P; 260/29.4 UA; 260/29.6 NR; 428/458; 428/460
[58] Field of Search .......... 260/29.4 UA, 21, 22 CB, 260/851, 29.6 RB, 29.6 NR, 23 P

[56] References Cited

U.S. PATENT DOCUMENTS

| | | | |
|---|---|---|---|
| 3,506,601 | 4/1970 | Sekmaras | 260/21 |
| 3,919,154 | 11/1975 | Chang et al. | 260/29.4 UA |

Primary Examiner—Theodore E. Pertilla
Attorney, Agent, or Firm—Dressler, Goldsmith, Clement, Gordon & Shore, Ltd.

[57] ABSTRACT

Aqueous dispersion thermosetting coating compositions are provided which bake to provide hard and flexible glossy coatings, the dispersion including an aqueous emulsion copolymer of ethylenic monomers including from 5–30% of non-nitrogenous hydroxy functional ethylenic materials, part of which are monomeric, and part polymeric, the ethylenic monomers being preferably copolymerized in admixture with organic mercaptan. The dispersion further includes aminoplast resin to cure the copolymer through its hydroxy functionality.

25 Claims, No Drawings

AQUEOUS DISPERSION THERMOSETTING COATING COMPOSITIONS BASED ON AQUEOUS EMULSION COPOLYMERS CONTAINING TWO SOURCES OF HYDROXY FUNCTIONALITY

This application is a combination of the disclosures presented in our prior applications Ser. Nos. 192,565, filed Oct. 26, 1971; and 351,453, filed April 16, 1973, both now abandoned. This is a continuation-in-part of each of said prior application. Copendency with the present application is provided by application Ser. No. 635,281, filed Nov. 26, 1975 now abandoned which is a continuation of said Ser. No. 192,565; and by application Ser. No. 690,602, filed May 27, 1976 now abandoned, which is a continuation of said application Ser. No. 351,453.

The present invention relates to acrylic aqueous dispersion systems which cure on baking to provide films of superior gloss and mar resistance consistent with the retention of flexibility. Aqueous emulsion coatings particularly adapted to provide high gloss exterior thermosetting coatings are included.

Prior efforts to provide high gloss emulsion systems have not been fully successful since not only was the gloss less than was desired, but the cured coatings when sufficiently hard and tough to resist marring (as when scuffed with the edge of a coin) were inadequately flexible. In this invention, gloss is improved and the cured coatings possess improved mar resistance combined with superior flexibility. The achievement of films possessing enhanced exterior durability is a feature of one aspect of this invention.

In accordance with the present invention, ethylenically unsaturated materials are copolymerized in aqueous emulsion, these ethylenic materials consisting essentially, based on the weight of the copolymer, of: A. at least about 70% by weight of monoethylenically unsaturated monomers free of functional groups other than the single ethylenic group and preferably including monomer which homopolymerizes to form soft polymer, such as an ester of acrylic acid with an alcohol containing at least two carbon atoms, and monomer which homopolymerizes to form hard polymer, such as styrene, vinyl toluene, or methyl methacrylate; and B. from 5–30% by weight of nonnitrogenous hydroxy functional ethylenically unsaturated materials including: a. 2–20% of monoethylenic monomer providing the hydroxy group; and b. 2–20% of hydroxy terminated polyethylenically unsaturated polyester. A small amount of monoethylenic unsaturated carboxylic acid is also desirably present, to obtain enhanced exterior durability, the monoethylenically unsaturated monomers free of functional groups other than the single ethylenic group and consist of styrene or vinyl toluene in an amount of from 10–30% and esters of acrylic and methacrylic acids, said esters of acrylic acid being with $C_2$–$C_{10}$ alcohols, and said esters of methacrylic acid being with $C_1$–$C_8$ alcohols, and said esters of methacrylic acid being present with respect to said esters of acrylic acid in a weight ratio of from 1:8 to 2:1.

The copolymerization is preferably carried out with mercaptan chain terminating agent present in the monomer mixture which is dispersed in the aqueous continuum and conventional free radical catalysts and suspending agents are employed to produce a stable dispersion of copolymer particles in the aqeuous continuum. These copolymer particles are solid particles of resin. The mercaptan functions to make the molecular weight more uniform, thereby enhancing physical properties.

An aqueous solution or dispersion of aminoplast resin, preferably pigmented, is then blended into the copolymer dispersion, desirably together with ammonia or amine to help stabilize the dispersion. A water miscible or immiscible organic solvent, such as butyl Cellosolve acetate (immiscible) or butyl Cellosolve, or ethylene glycol (miscible), is also desirably incorporated into the aqueous dispersion to assist the copolymer particles to coalesce when a film thereof is deposited on a substrate. A small proportion, e.g., from 2–10%, of an ester plasticizer such as dioctyl adipate or the like, is also desirably incorporated into the copolymer dispersion to assist coalescing and flow properties.

The aqueous coating compositions so-provided cure on baking to possess outstanding gloss in a mar-resistant flexible coating. Measured on a 60° photovolt glossmeter, the gloss is at least 80, preferably at least 85, and more preferably at least 90.

It is stressed that this invention employs, in the aqueous copolymer dispersion systems under consideration, a copolymer of uniform molecular weight which includes both monomeric and polymeric sources of hydroxy functionality, and it is this structure which enables the cured films to possess the improved properties which have been noted.

As indicated previously, from 5–30% of hydroxy functional materials are included in the copolymer by having these present in the monomer mixture which is copolymerized. A portion of these hydroxy functional materials must be monomeric and monoethylenic, though the monomer may contain one or several hydroxy groups. The N-methylol group includes the OH moiety, but compounds containing this group do not react in the same way as the hydroxy group and, therefore, the N-methylol group is not considered to be an hydroxy group. Indeed, the hydroxy monomers of this invention are nonnitrogenous.

The hydroxy functional monomers which are used in this invention are preferably illustrated by hydroxy alkyl esters of monoethylenic monocarboxylic acids, such as hydroxy ethyl acrylate, 2-hydroxy propyl acrylate, hydroxy ethyl methacrylate, 2-hydroxy propyl methacrylate, 4-hydroxy butyl methacrylate, and the like. Other hydroxy functional monomers which can be used are trimethylol propane monoallyl ether, ethylene glycol monoallyl ether, butylene glycol monoallyl ether, glycerol monoacrylate, 2-hydroxymethyl-5-norbornene, and the like.

The hydroxy monomer is used in an amount of from 2–20%, preferably 4–15%, based on the weight of the copolymer, and is preferably illustrated by hydroxy ethyl methacrylate.

The unsaturated hydroxy-functional polyesters which are used are, as is conventional, a product of polyesterification in one or more stages, of polybasic acids with polyhydric alcohols, the polyhydric alcohol being used in considerable stoichiometric excess to produce the hydroxy functionality which is desired.

The unsaturation required to permit interpolymerization or copolymerization can be introduced into the polyester by the polyesterification of an unsaturated polycarboxylic acid such as maleic acid, fumaric acid, itaconic acid, aconitic acid, glutaconic acid or citraconic acid, or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used such as allyl alcohol, methallyl alcohol or crotyl alcohol. Unsaturated monocarboxylic acids are illustrated by crotonic acid and by fatty acids containing conjugated unsaturation such as eleostearic acid, licanic acid or dehydrated castor oil fatty acids, this conjugated unsaturation providing reactive double bonds to enable copolymerization with the other monoethylenically unsaturated monomers which are copolymerized. Incorporation of monocarboxylic acids to provide the bulk of the desired unsaturation is particularly preferred in glycerine-based polyesters which denotes polyesters in which the bulk (over 50%) of the hydroxy groups are provided by glycerine. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha, beta-unsaturation, (2) beta, gamma-unsaturation, or (3) conjugated unsaturation. When the unsaturation is in a chain not a part of the linear polyester backbone, the danger of gelation on polymerization is reduced, but the use of unsaturated dicarboxylic acids such as maleic, fumaric or itaconic acids is permitted, especially in small amount.

Broadly, the unsaturated polyester resin should contain about 0.005 to 0.40 gram mol of ethylenically unsaturated component per 100 grams of polyester. Of course, the precise preferred proportion of unsaturation with vary depending on the reactivity of the unsaturated component (maleic acid is more reactive than crotonic acid). Moreover, practical aspects of processing must be kept in mind since, with less unsaturation, one may copolymerize for longer periods of time and/or under more vigorous conditions. With more unsaturation, there is a tendency to gel, especially with more reactive materials such as maleic anhydride or acid. However, one can terminate the reaction before gelation, especially when the reaction is carefully supervised or effected under mild conditions. Preferably, and when using polyesters containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.03–0.3 gram mol of unsaturated component per 100 grams of polyester.

The hydroxy functional polyester resin should have an hydroxy functionality indicated by an hydroxyl number of from 100–350, preferably from 150–300 (milligrams of KOH to saponify 1 gram of resin).

The hydroxy-functional unsaturated polyester, like the hydroxy monomer, is preferably used in an amount of from 2–12%, more preferably from 4–10%, based on the weight of the copolymer. The two different sources of hydroxy functionality are desirably used in a weight ratio of from 2:1 to 1:2, preferably in about an equiweight ratio.

While the molecular weight of the unsaturated polyester is of secondary significance so long as the polyester is not gelled, it is desirable to employ polyesters which have a viscosity in n-butanol at 80% solids in the range of from C to $Z_6$, preferably in the range of from T to $Z_2$, measured on the Gardner scale at 25° C.

The proportion of oil which is incorporated in the polyester is of secondary significance in the invention. Indeed, oil may be entirely omitted. However, it is distinctly preferred to have a proportion of oil or more preferably oil fatty acid present. Thus, the polyester may include various proportions of oil such as: (1) short oil (20–30% by weight of oil); (2) medium oil (30–60% by weight of oil); and (3) long oil (60–70% by weight of oil). Short oil polyesters are preferred.

The preferred hydroxy functional polyethylenically unsaturated polyesters in accordance with this invention are glycerine-based polyesters made from components containing an at least 25% stoichiometric excess of hydroxy functionality, the bulk of the unsaturation in said polyester being contained in the residues of ethylenically unsaturated monocarboxylic acids. The most preferred glycerine-based polyesters are short oil polyesters which have an hydroxy value of at least 100, a Gardner viscosity in n-butanol at 80% solids in the range of from T to $Z_2$, and which contain from 0.03–0.3 gram mol of unsaturated component per 100 grams of polyester.

While the polyesters used in the invention have their molecular weight primarily as a result of a polyesterification reaction, it is permissible to include some other mechanism to provide a portion of the advance of the polyester to its final viscosity, e.g., a small amount of organic diisocyanate, preferably an aliphatic diisocyanate such as dicyclohexylmethane-4,4-diisocyanate, can be used to increase the molecular weight of the polyester through a urethane-forming reaction with a portion of the polyester hydroxy.

A particularly preferred hydroxy-functional polyester for use in the invention is prepared as follows, and is referred to hereinafter as "Hydroxy-Functional Polyester Resin A".

Charge into a reactor equipped with an agitator, heating mantle, Dean-Stark trap, thermometer and nitrogen inlet tube, 790 grams of dehydrated castor oil fatty acids, 250 grams of crotonic acid, 785 grams of glycerine, and 400 grams of isophthalic acid. Add 50 grams of xylol as reflux solvent. Heat to 420° F. and hold for acid value of 5.0. Cool to 380° F. and add 240 grams of a technical grade of 1,1'-isopropylidenebis(p-phenyleneoxy)-di-2-propanol, 160 grams of phthalic anhydride and 255 grams of azelaic acid. Heat to 420° F. and hold for an acid value of 13–15. Add 510 grams of butyl alcohol to provide a solution containing 80% solids.

The final characteristics of the polyester resin are:
Solids (percent) — 79.5
Viscosity (Gardner) — V-W
Color (Gardner) — 3–4

It is preferred, but not essential, to have the copolymer include a small proportion, up to about 15%, but more preferably from 0.3–10%, most preferably from 0.5–2%, based on the weight of the copolymer, of monoethylenically unsaturated carboxylic acid, such as acrylic acid, methacrylic acid, crotonic acid, fumaric acid, monobutyl maleate, and the like. The presence of a small amount of acid helps to stabilize the aqueous dispersions in the presence of ammonia or an amine and it also helps the ultimate cure with aminoplast resin.

The balance of the copolymer consists essentially of monoethylenically unsaturated monomer devoid of functional groups other than the single ethylenic group which is consumed in the copolymerization reaction. As previously pointed out, a balance of monomers producing hard homopolymers and monomers producing soft homopolymers is preferably used. While this balancing of monomers of the two types noted is itself well known, preferred practice in this invention can employ a larger proportion of hardening monomer than is customary contributing, in the thermosetting systems under consideration, an increased hardness which, in the presence of the toughness contributed by the two different sources of hydroxy functionality, provides superior mar resistance in a flexible coating.

It is particularly preferred to employ styrene or vinyl toluene in combination with a $C_2$-$C_{10}$ ester of acrylic acid, especially isobutyl acrylate. Here, an excess by weight of styrene or vinyl toluene up to a weight ratio of 3:1 is preferred to maximize hardness. It is unusual to be able to obtain the extra hardness which is conferred through the use of excess styrene or vinyl toluene while maintaining adequate flexibility, and isobutyl acrylate is especially superior from this standpoint. Simple alcohol esters are contemplated as further illustrated by ethyl acrylate and 2-ethylhexyl acrylate.

Methyl methacrylate may be used in place of styrene or vinyl toluene, especially as a partial replacement. Vinyl acetate in admixture with vinyl versatate will illustrate another preferred combination of monomers.

To enhance exterior durability, the monoethylenically unsaturated monomer devoid of functional groups other than the single ethylenic group should consist of from 10-30% of styrene or vinyl toluene in admixture with esters of acrylic and methacrylic acid. The esters of acrylic acid are with alcohols containing from 2-10 carbon atoms, whereas the esters of methacrylic acid are with alcohols containing from 1-8 carbon atoms. The weight ratio of methacrylic acid esters to acrylic acid esters should be in the range of 1:8 to 2:1, and is preferably in the range of from 1:4 to 1.5:1.

Of the various methacrylic acid esters, isobutyl acrylate is particularly preferred because of its favorable copolymerization rate with styrene or vinyl toluene, and also because it assists the maximum hardness and physical toughness in combination with the acrylic acid ester. Indeed, best results are obtained by combining isobutyl methacrylate with isobutyl acrylate in a weight ratio of from 1:2 to 1:1.

The selection of monomers in this invention will normally provide a copolymer having a glass transition temperature above room temperature, but copolymers having a glass transition temperature as low as about 0° C. can be used where films of lesser hardness are desired.

Up to about 5% by weight of the copolymer may be constituted by diverse materials to improve adhesion or other special property, and the inclusion of such small amount of special monomers for special purpose is contemplated by the language "consisting essentially". These special monomers are illustrated by amine-functional monoethylenic compounds such as are taught in Sekmakas U.S. Pat. Nos. 3,356,653 and 3,356,654.

The aqueous emulsion copolymer is produced by copolymerizing a liquid mixture of polymerizable monomers dispersed in aqueous medium in the form of finely divided particles of sufficient fineness (up to about 3 mincrons) to be stably dispersed in water. As is known, aqueous emulsion copolymers are usually of high molecular weight, but the emulsion copolymers of this invention are produced using mercaptan in the liquid mixture of monomers to lower the molecular weight of the copolymer particles and to render the molecular weight more uniform.

The emulsion copolymers are preferably copolymerized using a procedure which will produce fine particle size emulsions. Preferred particle size is from 0.05 to 1 micron, though from 0.01 to 3 microns is broadly contemplated. These fine particle size latex emulsions are prepared by incrementally adding the unsaturated copolymerizable material to a water solution which has dispersed therein surface active agents. The addition is made under conditions conductive to addition copolymerization so that copolymerization takes place as the materials are added, thus allowing for the formation of fine particle size emulsions. To allow copolymerization to take place as the unsaturated copolymerizable materials are added to the emulsion, it is desirable that polymerization catalysts be present in the water phase of the emulsion as the unsaturated copolymerizable materials are added thereto. It is understood that this is not essential though it is preferred, and that the polymerization catalyst can be in admixture with the unsaturated copolymerizable materials as they are added to the emulsion, or the catalyst can be added to the water phase as polymerization proceeds.

The polymerization catalysts which may be used in accordance with the invention to provide conventional free radical catalysis can be of the water soluble type such as potassium persulfate, ammonium persulfate and hydrogen peroxide, or of the water-insoluble type which are soluble in one or more of the monomers used herein, such as benzoyl peroxide, cumene hydroperoxide, and methyl ketone perioxide as desired. Preferably, the water-solublecatalysts are used as the monomer soluble type tend to produce large particle size emulsions. A combination of the water-soluble and monomer soluble catalysts may also be used.

When the polymerization catalysts of the persulfate type are used, they decompose, resulting in acidic products. It is preferred to buffer the system to maintain the pH in the range of from 2.5-5.0 during polymerization with materials such as sodium bicarbonate, etc.

Emulsification is maintained using conventional suspending agents, particularly an anionic surface active agent, preferably in combination with a nonionic surface active agent. In the examples set forth hereinafter, the anionic agents are sodium lauryl sulfate and sodium dodecyl benzene sulfonate, and the nonionic agent is nonyl phenoxy (polyethyleneoxy) ethanol containing about 10 ethylene oxide groups per molecule. While these specific agents are preferred, other anionic agents are illustrated by sodium dioctyl sulfosuccinate and sodium octylphenoxy polyethylene oxide sulfonate containing about 20 ethylene oxide groups per molecule. Appropriate anionic commercial compositions are Triton X-200 and Duponol ME. Other nonionic agents are illustrated by octyl phenoxy (polyethyleneoxy) ethanol. Appropriate nonionic commercial compositions are Triton X-100, Igepal CO-630, Tergitol NPX and Tergitol NP-14. The anionic surface active agent when used alone is preferably added in amounts of from 0.1% to 3% by weight, based on the total weight of the emulsion product produced in accordance with the invention. When the anionic surface active agent is used in combination with the nonionic surface active agent, it is preferably added in amounts of from 0.1% to 2% by weight. The nonionic surface active agent is preferably used in amounts of from 0.5% to 4% by weight.

The class of mercaptans which are useful as chain terminators in the polymerization of ethylenic monomers is well known and any compound having the formula R-SH can be used, R denoting a saturated hydrocarbon radical, preferably one containing from 2-24 carbon atoms. Tertiary dodecyl mercaptan will be used as illustrative. The mercaptan is used in an amount of from 0.05 to about 5%, preferably from 0.5-3%, based on the weight of the copolymer.

The aqueous dispersions of this invention include hydroxy functional copolymer particles dispersed in an aqueous continuum. The copolymer is cured by reaction of its hydroxy groups with the N-methylol group contained in an aminoplast resin which is dispersed or dissolved in the aqueous continuum for codeposit with the copolymer since this facilitates pigmentation of the system as will be explained.

The term "aminoplast resin" is a conventional one, designating heat-hardening reaction products of an aldehyde, normally formaldehyde, with a polyfunctional amine, such as urea, melamine, benzoguanamine, or other triazine. A stoichiometric excess of formaldehyde is frequently used to provide the heat-hardening properties. The resins are frequently etherified, usually with methanol, to promote water solubility. Since this class is well known for use both in water and in organic solvent for the cure of hydroxy functional resins, it will not be discussed at great length and will be illustrated herein by hexamethoxy methyl melamine, which is water dispersible, but not water soluble in the absence of organic solvent such as ethanol.

The proportion of aminoplast resin, based on total resin solids, may vary from about 3% to about 40%, but is preferably from 5-30%. Most usually, the aminoplast is used in an amount of from 8-25%.

While the emulsion of this invention may be unpigmented to deposit clear films, pigmented systems are preferred. The pigment may be incorporated in any desired manner as is conventional in the production of pigmented aqueous latices. However, gloss is maximized in this invention by grinding the pigment into a water soluble or dispersible aminoplast resin which can then be mixed into the copolymer emulsion directly, or first dispersed in water to form an aqueous paste which is then mixed into the copolymer emulsion. Titanium dioxide is a typical pigment and will be used herein. Aluminum pigment will be used to illustrate coatings having exterior durability.

The use of ammonia or an amine to help to stabilize aqueous emulsions of acidic copolymers is itself known. Hydroxy functional amines are particularly useful and this class of materials is illustrated herein by dimethyl ethanol amine. Other amines which may be used are triethyl amine and methyl diethanol amine. Even partial neutralization is helpful, but it is preferred to use enough amine to provide a pH of 6.0 or higher up to about 11, preferably from 7 to 10.

Lastly, it is also preferred to include a small amount of high boiling water miscible or immiscible organic solvent in the emulsion to help the copolymer particles coalesce. Particle coalescence usually occurs prior to baking as the water evaporates during a 5-10 minute flash period which is permitted to occur before baking, but the presence of a glycol, such as ethylene glycol or diethylene glycol aids coalescence and flow during the bake. 2-butoxy ethanol acetate may also be used.

The compositions of the invention are cured by baking, typical baking conditions ranging from 300° F. to 550° F. for a period of time of from 30 minutes to 30 seconds.

As will be evident, the coating composition can be pigmented or clear and dyes, waxes and various other components may be included as will be evident to those skilled in the art.

The invention is illustrated in the comparative examples which follow, in which all parts are by weight unless otherwise indicated.

TABLE I

Examples 1-3 - Emulsion Production

| Composition Number | Ingredients | Example 1* | Example 2* | Example 3* |
|---|---|---|---|---|
| 1 | isobutyl acrylate | 32.0 | 32.0 | 29.4 |
| 2 | styrene | 57.1 | 57.1 | 52.6 |
| 3 | hydroxyethyl methacrylate | none | 8.7 | 8.0 |
| 4 | methacrylic acid | 2.0 | 2.2 | 2.0 |
| 5 | hydroxyfunctional polyester resin A | 8.7 | none | 8.0 |
| 6 | tertiary dodecyl mercaptan | 1.0 | 1.0 | 1.0 |
| 7 | sodium lauryl sulfate | 0.80 | 0.80 | 0.80 |
| 8 | nonyl phenoxy(polyethyleneoxy)ethanol | 2.42 | 2.42 | 2.42 |
| 9 | sodium dodecyl benzene sulfonate | 0.068 | 0.068 | 0.068 |
| 10 | potassium persulfate | 0.37 | 0.37 | 0.37 |
| 11 | sodium bicarbonate | 0.10 | 0.10 | 0.10 |
| 12 | dimethyl ethanol amine | 0.80 | 0.80 | 0.80 |

*proportions in this Table and the description which follows are given in parts per 100 parts of ethylenic materials (items 1-5).

The ethylenic materials of items 1-5 are premixed together with the mercaptan of item 6 and dispersed in 54.5 parts of water containing the surfactants of items 7 and 8 to form an emulsion. The persulfate of item 10 and the bicarbonate of item 11 are dissolved in 55.5 parts of water along with the surfactant of item 9 and preheated in a reactor to 170° F. with a nitrogen blanket to provide a heated catalyst solution. The emulsion of items 1-8 is then added slowly to the reactor containing the heated catalyst solution over 2½ hours at 170°-175° F. After addition of ethylenic materials is complete, hold for one hour at 175° F., cool to 90° F. and add the amine of item 12. The products of Examples 1, 2 and 3 were then formulated into a paint as follows.

Table II

Paint Formulation

| Ingredients | Wet Weight | Non-Volatile |
|---|---|---|
| titanium dioxide rutile | 275.0 | 275.0 |
| dimethyl ethanol amine | 4.0 | |
| hexamethoxymethyl melamine | 43.2 | 43.2 |
| water | 125.0 | |
| 2-butoxy ethanol acetate | 14.3 | |
| aqueous dispersion of Examples 1, 2 or 3 at 47.0% non-volatile material | 610.0 | 287.0 |
| Total Weight | 1071.5 | 605.2 |

The three paints formulated as indicated in Table II were then applied by a Bird applicator onto steel panels to deposit a wet coating having a thickness of about 3 mils and the coated panels were then baked about 17 minutes at 375° F., the following properties being obtained.

Table III

| Properties | Paint Properties | | |
|---|---|---|---|
| | Example 1 | Example 2 | Example 3 |
| hardness (pencil) | F | 2H | 2H |
| metal mar resistance | poor | poor | excellent |
| impact (80 inch pounds of forward impact) | marginal | fail | marginal |
| gloss (60 degree) | 90 | 83 | 94 |

As will be evident, Example 3 which follows the present invention uniquely provides maximum hardness and acceptable flexibility with superior metal mar resistance and superior gloss.

EXAMPLE 4

| RAW MATERIALS | PARTS |
|---|---|
| A. Distilled Water | 55.56 |
| B. Sodium Bicarbonate | 0.10 |
| C. Potassium Persulfate | 0.37 |
| D. Sodium Dodecyl Benzene Sulfonate (98% active) | 0.09 |
| E. Distilled Water | 54.56 |
| F. Sodium Lauryl Sulfate (30% active) | 2.67 |
| G. Nonyl Phenoxy (polyethyleneoxy) ethanol (9½ mols of ethylene oxide per mol of phenol) | 2.42 |
| H. Styrene | 28.28 |
| I. Isobutyl Acrylate | 33.61 |
| J. Isobutyl Methacrylate | 20.11 |
| K. Hydroxyethyl Methacrylate (94% active) | 8.50 |
| L. Methacrylic Acid | 2.00 |
| M. Hydroxy Functional Polyester Resin A (80% solids) | 10.00 |
| N. Dimethylethanolamine | 1.00 |
| O. t-Dodecyl Mercaptan | 0.50 |

PROCEDURE

1. Charge item A to reactor, sparge with nitrogen for 20 minutes while heating to 75° C.
2. Blend items E through G in a glass beaker. Check to determine that item G is completely solvated prior to starting step 3.
3. Charge items H through M and O to a glass beaker described in step 2 under good agitation. Items H through M and O may be blended prior to charging. Decrease agitation when a good pre-emulsion is obtained.
4. To the reactor, when at 75° C., charge items B, C, and D. Addition of pre-emulsion should be started within 3 to 4 minutes.
5. Start addition of pre-emulsion as described in step 3 to reactor at such a rate as to allow for a total addition time of 2½ hours. Maintain reactor temperature between 82°-84° C.
6. Hold the reactor for 2 hours after addition is complete or until solids of 46.8 is obtained. Maintain temperature between 84°-86° C.
7. Cool reactor to 37° C.
8. Charge slowly item N to reactor under good agitation.
9. Filter emulsion.

EMULSION CHARACTERISTICS

| Solids | Actual - 46.8-47.0 Theory - 47.66 |
|---|---|
| pH | 7.8-8.1 |
| Viscosity*, cps | 300-475 |
| Wt./Gal. | 8.60 |
| Freeze-Thaw | Pass 4 cycles |
| Heat Stability | Pass 10 days/54° C. |

*Brookfield Viscometer, Spin #2, 20 R.P.M.

The polymer contained in the emulsion has a $T_g$ of about 13° C.

The above emulsion is formulated into the following automotive paint.

EXAMPLE 5

| Water Base Blue Metallic Paint | | |
|---|---|---|
| MATERIAL | | POUNDS |
| 1. Emulsion of Example 1 | | 700.0 |
| 2. Dioctyl Adipate | | 20.0 |
| 3. Hexamethoxy Methyl Melamine | | 61.0 |
| 4. Aluminum Pigment (Alcoa 825) | | 8.0 |
| 5. Ethylene Glycol | | 40.0 |
| 6. Water | | 65.0 |
| 7. Anionic Surfactant (60% solution in water (dioctyl sodium succinate) | | 3.0 |
| 8. Nonionic Surfactant (item G in Example 4 | | 3.0 |
| 9. Dimethylethanolamine | | 4.0 |
| 10. Permanent Violet Tinting Base | | 3.0 |
| 11. Phthalo Cyanine Blue Tinting Base | | 3.0 |
| | | 909.0 |

METHOD OF PREPARATION

Disperse #4 into #3; then add #7, #8, and #9. Disperse approximately one hour. Add dispersion to #1; then add with good agitation #6, #5, and #2. Add #10 and #11; then filter through 50 mesh organdy cloth.

The water base paint described above has a viscosity of 14-15 seconds measured in a #4 Ford Cup at 80° F., and is sprayed using an air pressure of 70 p.s.i. to provide a fluid delivery of 260-275 cc/minute. Two coats are applied using two passes per coat, and allowing 1¾ minutes between the first and second coats. After application, the coated steel panels are allowed to flash dry 8½ minutes, and the flash dried panels are baked for 30 minutes at 300° F. The final cured coatings have a pencil hardness of H-2H, a 60° gloss reading of 90, the product passes the conical mandrel test, and it also passes forward impact testing at 80 inch/pounds.

The invention is defined in the claims which follow.

We claim:

1. An aqueous latex dispersion thermosetting coating composition comprising water having dispersed therein;

(1) an aqueous emulsion copolymer of ethylenically unsaturated materials consisting essentially, based on the weight of the copolymer, of:

(A) at least about 70% by weight of monoethylenically unsaturated monomers free of functional groups other than said monoethylenic saturation; and (B) from 5-30% by weight of non-nitrogenous hydroxy functional ethylenically unsaturated materials including:

a. 2-20% of monoethylenically unsaturated monomer containing only hydroxy groups; and b. 2-20% of hydroxy-terminated polyethylenically unsaturated polyester having an hydroxy number of from 100 to 350, said ethylenically unsaturated materials being copolymerized in aqueous emulsion in admixture with from 0.05% to about 5%, based on the weight of the copolymer, of mercaptan; and (2) from about 3% to about 40%, based on the total weight of resin solids, of an aminoplast resin.

2. An aqueous dispersion as recited in claim 1 in which said hydroxy functional polyester contains about 0.005 to 0.40 gram mol of ethylenically unsaturated component per 100 grams of polyester and said polyester has a Gardner viscosity in n-butanol at 80% solids in the range of C to $Z_6$.

3. An aqueous dispersion as recited in claim 1 in which said hydroxy-functional polyester is an oil-containing polyester.

4. An aqueous dispersion as recited in claim 3 in which said hydroxy-functional polyester is a short oil polyester.

5. An aqueous dispersion as recited in claim 1 in which said hydroxy-functional ployester is a short oil glycerinebased polyester made from components containing an at least 25% stoichiometric excess of hydroxy functionality, has a Gardner viscosity in n-butanol at 80% solids in the range of from T to $Z_2$ and contains from 0.03-0.3 gram mol of unsaturated monocarboxylic acid component per 100 grams of polyester.

6. An aqueous dispersion as recited in claim 1 in which said monoethylenically unsaturated monomers free of functional groups consist of styrene or vinyl toluene in combination with $C_2$-$C_{10}$ alcohol ester of acrylic acid, said styrene or vinyl toluene being used in a weight excess with respect to said ester of up to 3:1.

7. An aqueous dispersion as recited in claim 6 in which said $C_2$-$C_{10}$ alcohol ester of acrylic acid is isobutyl acrylate.

8. An aqueous dispersion as recited in claim 1 in which said hydroxy-functional ethylenically unsaturated material includes 4-15% of said monomer and 4-15% of said polyester, said two different sources of hydroxy functionality being in a weight ratio of from 2:1 to 1:2.

9. An aqueous dispersion as recited in claim 8 in which said hydroxy-functional monomer is an hydroxy alkyl ester of a monoethylenic monocarboxylic acid.

10. An aqueous dispersion as recited in claim 1 in which said copolymer includes up to about 15% of monoethylenically unsaturated carboxylic acid.

11. An aqueous dispersion as recited in claim 10 in which said monoethylenically unsaturated carboxylic acid is present in an amount of from 0.3-10% of said copolymer.

12. An aqueous dispersion as recited in claim 10 in which said copolymer is stabilized with ammonia or an amine.

13. An aqueous dispersion as recited in claim 1 in which said monomers are selected to provide a copolymer having a glass transition temperature above room temperature.

14. An aqueous dispersion as recited in claim 1 in which said monoethylenically unsaturated monomers free of functional groups other than said monoethylenic unsaturation consist of styrene or vinyl toluene in an amount of from 10-30% and esters of acrylic and methacrylic acids, said esters of acrylic acid being with $C_2$-$C_{10}$ alcohols, and said esters of methacrylic acid being with $C_1$-$C_8$ alcohols, and said esters of methacrylic acid being present with respect to said esters of acrylic acid in a weight ratio of from 1.8 to 2:1, and said hydroxy-terminated polyethylenically unsaturated polyester is used in an amount of from 2–12%.

15. An aqueous dispersion as recited in claim 14 in which said methacrylic acid esters are constituted by isobutyl methacrylate and the weight ratio of methacrylic esters to acrylic esters is in the range of from 1:4 to 5:1.

16. An aqueous dispersion as recited in claim 15 in which said acrylic acid esters are constituted by isobutyl acrylate, and the weight ratio of isobutyl methacrylate to isobutyl acrylate is in the range of from 1:2 to 1:1.

17. An aqueous dispersion as recited in claim 14 in which said hydroxy functional polyester is an oil-containing polyester including about 0.005 to 0.40 gram mol of ethylenically unsaturated component per 100 grams of polyester and said polyester has a Gardner viscosity in n-butanol at 80% solids in the range of C to $Z_6$.

18. An aqueous dispersion as recited in claim 14 in which said hydroxy-functional polyester is a glycerine-based polyester made from components containing an at least 25% stoichiometric excess of hydroxy functionality, has a Gardner viscosity in n-butanol at 80% solids in the range of from T to $Z_2$, and contains from 0.03-0.3 gram mol of unsaturated monocarboxylic acid component per 100 grams of polyester, and said hydroxyfunctional monomer is an hydroxy alkyl ester of a monoethylenic monocarboxylic acid.

19. An aqueous dispersion as recited in claim 1 in which said mercaptan is present in an amount of from 0.5-3%.

20. An aqueous dispersion as recited in claim 19 in which said aminoplast resin is hexamethoxymethyl melamine and is present in an amount of from 5-30%, based on the total weight of resin solids.

21. An aqueous dispersion as recited in claim 20 in which said aminoplast resin is pigmented.

22. An aqueous dispersion as recited in claim 14 in which said mercaptan is present in an amount of from 0.5-3%.

23. An aqueous dispersion as recited in claim 22 in which said aminoplast resin is hexamethoxymethyl melamine and is present in an amount of from 5-30%, based on the total weight of resin solids.

24. An aqueous dispersion as recited in claim 23 in which said dispersion further includes from 1-10% by weight, based on the total weight of resin solids, of an ester plasticizer.

25. An aqueous dispersion as recited in claim 24 in which said dispersion further includes ethylene glycol to assist coalescence and flow on baking.

* * * * *

UNITED STATES PATENT AND TRADEMARK OFFICE
CERTIFICATE OF CORRECTION

PATENT NO. : 4,132,688
DATED : Jan. 2, 1979
INVENTOR(S) : Donald J. Berenschot, Dale F. Anders and Fred D. Hawker It is certified that error appears in the above-identified patent and that said Letters Patent are hereby corrected as shown below:

Col. 1 in the Assignee, change the assignee to read --DeSoto, Inc., --; col. 1, line 67, correct the spelling of "aqueous"; Col. 3, line 40, change "with" to --will--; Col. 6, line 18, correct the spelling of "conducive"; Col. 6, line 40, separate the words "soluble" and "catalysts"; Col. 11, line 19, hyphenate "glycerine-based"

Signed and Sealed this

Seventeenth Day of April 1979

[SEAL]

Attest:

RUTH C. MASON
Attesting Officer

DONALD W. BANNER
Commissioner of Patents and Trademarks